(12) United States Patent
Powell et al.

(10) Patent No.: US 8,012,063 B2
(45) Date of Patent: Sep. 6, 2011

(54) PRESSURE ASSISTED PARK SERVO

(75) Inventors: Stephen W. Powell, South Lyon, MI (US); Mark A. Vernacchia, Northville, MI (US); Brian W. Whitmarsh, Commerce, MI (US); Ryan M. Jenness, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 788 days.

(21) Appl. No.: 12/029,765

(22) Filed: Feb. 12, 2008

(65) Prior Publication Data

US 2008/0214350 A1  Sep. 4, 2008

Related U.S. Application Data

(60) Provisional application No. 60/892,683, filed on Mar. 2, 2007.

(51) Int. Cl.
- *B60T 11/10* (2006.01)
- *B60T 13/00* (2006.01)
- *B60W 10/06* (2006.01)
- *F16H 31/00* (2006.01)
- *F16H 59/00* (2006.01)

(52) U.S. Cl. ......... 477/198; 477/202; 475/140; 74/335; 303/9

(58) Field of Classification Search .......... 477/193, 477/198, 201, 202, 906, 907; 475/116, 132, 475/133, 140; 74/335, 473.11; 303/3, 9, 15, 20

See application file for complete search history.

(56) References Cited

U.S. PATENT DOCUMENTS

| | | | | |
|---|---|---|---|---|
| 3,893,549 A * | 7/1975 | Bennett | ........................ | 188/170 |
| 4,998,443 A | 3/1991 | Janiszewski | | |
| 5,409,434 A * | 4/1995 | Furukawa et al. | ............ | 477/131 |
| 5,445,042 A | 8/1995 | Deady | | |
| 5,695,260 A * | 12/1997 | Tanaka et al. | ............ | 303/122.12 |
| 5,851,164 A * | 12/1998 | Habuchi et al. | ............... | 477/127 |
| 6,116,391 A * | 9/2000 | Kremmling et al. | ......... | 192/3.58 |
| 6,324,928 B1 * | 12/2001 | Hughes | ............................. | 74/335 |
| 6,357,311 B1 * | 3/2002 | Rose | ............................... | 74/335 |
| 6,422,104 B2 * | 7/2002 | Kamiya | ........................... | 74/335 |
| 2004/0069082 A1 * | 4/2004 | Koenig et al. | .................... | 74/335 |

FOREIGN PATENT DOCUMENTS

| | | |
|---|---|---|
| EP | 0 294 033 B1 | 7/1992 |
| EP | 0 649 998 A1 | 4/1995 |

* cited by examiner

*Primary Examiner* — Roger Pang

(57) ABSTRACT

A pressure assisted park servo assembly for an automatic transmission includes a servo or spool valve which receives pressurized hydraulic fluid from various sources including two solenoid valves and transmission ports. The servo valve controls two flows of pressurized hydraulic fluid to a servo assembly to place the transmission in or release it from park. The improved park servo assembly exhibits enhanced operating speed.

14 Claims, 3 Drawing Sheets

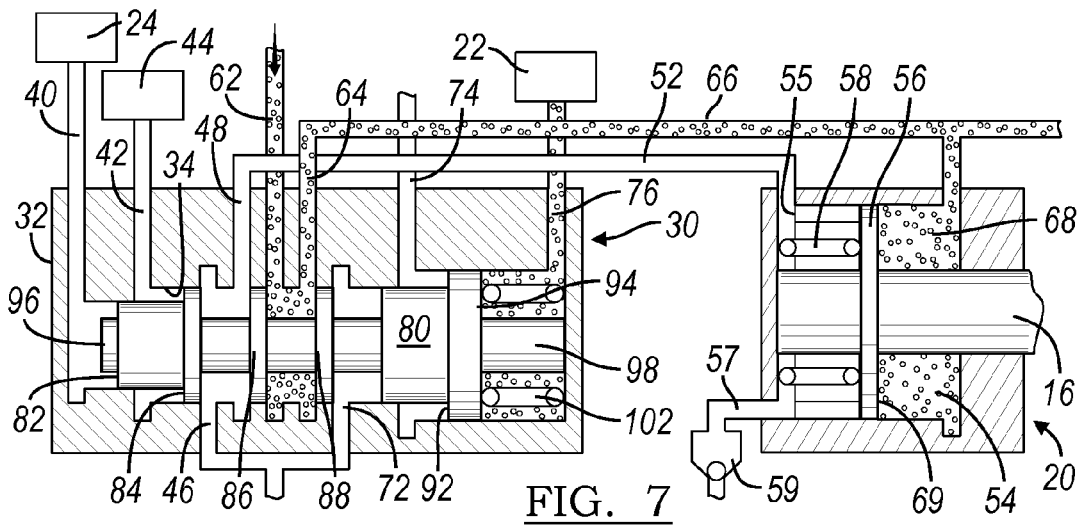
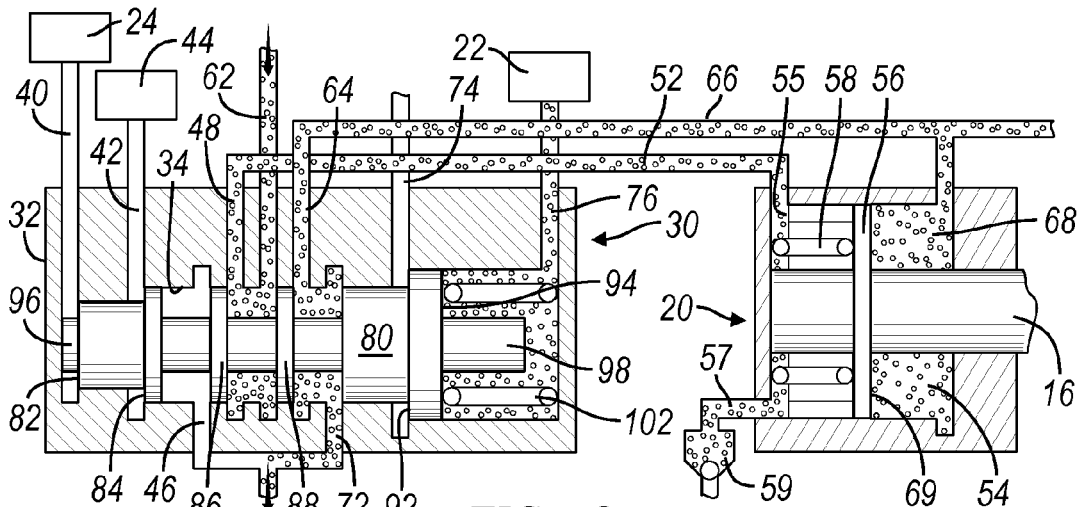
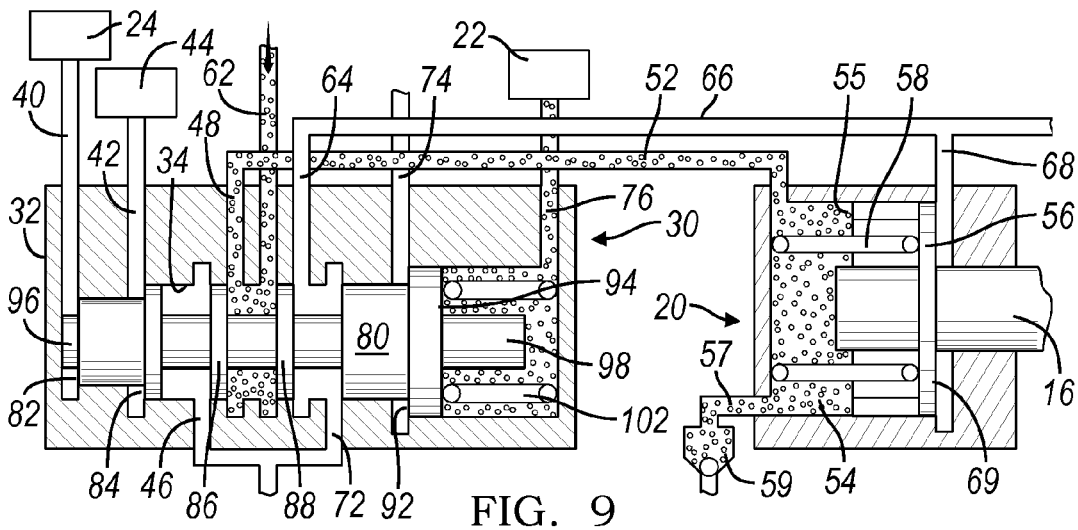

US 8,012,063 B2

PRESSURE ASSISTED PARK SERVO

CROSS-REFERENCE TO RELATED APPLICATIONS

This application claims the benefit of U.S. Provisional Application No. 60/892,683 filed on Mar. 2, 2007. The disclosure of the above application is incorporated herein by reference.

TECHNICAL FIELD

The present invention relates generally to a park servo for an automatic transmission and more particularly to a park servo for an automatic transmission having a pressure assisted return to park piston.

BACKGROUND

In previous automatic transmissions having an electronic transmission range shift (ETRS) feature, electro-hydraulic solenoid/valves (solenoids) have been used to provide pressurized hydraulic fluid to a hydraulic servo that rotates the manual shaft to release and place the vehicle transmission in park. Particularly in cold environments, the time necessary for the hydraulic servo to return the transmission to park after such a shift command, though not long, may be viewed as less than optimal. Accordingly, it has been determined that improvements in return to park actuators for automatic transmissions are desirable.

SUMMARY

A pressure assisted park servo assembly for an automatic transmission typically having an electronic transmission range shift (ETRS) configuration includes a multiple port servo or spool valve which receives pressurized hydraulic fluid from various sources including two solenoids and transmission ports. The spool valve controls two flows of pressurized hydraulic fluid to a park servo to quickly place the transmission in or release it from park. The park servo includes a compression spring which also urges the park servo toward its park position. The fluid sources within the transmission maintain or latch the spool valve and park servo on the out of park position.

Thus it is an object of the present invention to provide a pressure assisted park servo for an automatic transmission having electronic transmission range shift.

It is a further object of the present invention to provide a pressure assisted park servo assembly for an automatic transmission having a servo or spool valve which receives pressurized hydraulic fluid from solenoids and the transmission.

It is a still further object of the present invention to provide a servo valve and pressure assisted park servo that provides enhanced operating speed.

It is a still further object of the present invention to provide a pressure assisted park servo having a compression spring which urges the servo piston toward the park position.

Further objects and advantages of the present invention will become apparent by reference to the following description and appended drawings wherein like reference numbers refer to the same component, element or feature.

BRIEF DESCRIPTION OF THE DRAWINGS

FIG. 7 is a diagrammatic view of a servo valve and pressure assisted park servo according to the present invention commencing movement back to the park position;

FIG. 8 is a diagrammatic view of a servo valve and pressure assisted park servo according to the present invention moving back to the park position; and FIG. 9 is a diagrammatic view of a servo valve and pressure assisted park servo according to the present invention in the park position.

DESCRIPTION OF THE PREFERRED EMBODIMENT

Figure 1:
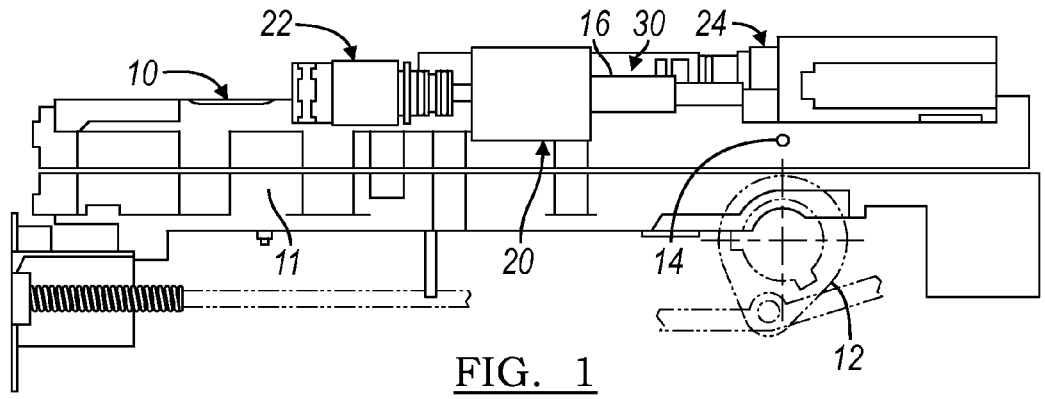
FIG. 1 is a pictorial view of an improved pressure assisted park servo assembly according to the present invention installed on an automatic transmission.

Referring now to FIG. 1, an automatic transmission is illustrated and generally designated by the reference number 10. Typically, the automatic transmission 10 will include an electronic transmission range shift (ETRS) feature. The automatic transmission 10 includes a housing 11 which is preferably a metal casting and includes numerous openings, shoulders, flanges and other features (not illustrated) which receive, locate and support various components of the automatic transmission 10. Extending through one such opening in the housing 11 is a manual shaft 12 which is coupled to and translates park components between Park and Out of Park ranges within the automatic transmission 10. The manual shaft 12 is coupled though a suitable linkage 14 to the bi-directionally translating output shaft or piston rod 16 of a pressure assisted park servo 20 according to the present invention.

Also associated and in fluid communication with the pressure assisted park servo 20 is a return to park solenoid 22, an out of park solenoid 24 which are both connected to a source of pressurized hydraulic fluid (not illustrated) and a hydraulic, multiple port ETRS, servo or spool valve 30.

Figure 2:
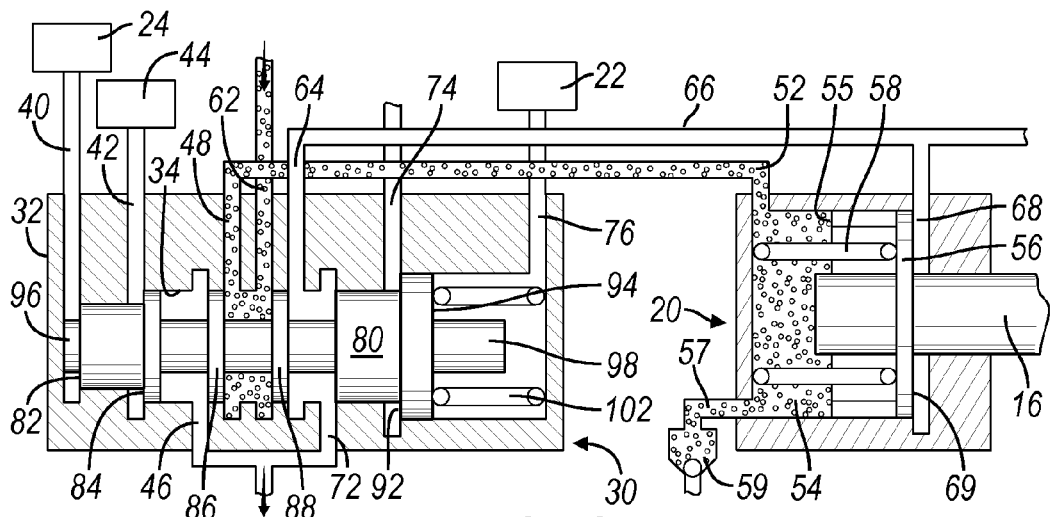
FIG. 2 is a diagrammatic view of a servo valve and pressure assisted park servo according to the present invention in the park position.

Referring now to FIG. 2, it will be appreciated that the servo or spool valve 30 includes a housing 32 which defines a cylindrical bore 34 of diverse diameters and a plurality of preferably radial passageways or ports which communicate with the cylindrical bore 34. A first control port 40 is disposed at one end of the bore 34 and communicates with the outlet or control side of the out of park solenoid 24. A second control port 42 is disposed adjacent the first port 40 and communicates between the bore 34 and the outlet or control side of a drive and braking solenoid 44. A first exhaust port 46 is adjacent the second control port 42 and communicates between the bore 34 and a hydraulic sump or reservoir (not illustrated). A third control port 48 communicates through a first hydraulic line 52 to a first chamber 54 in the pressure assisted park servo 20. Pressurized hydraulic fluid in the first chamber 54 provides force against one face 55 of a piston 56 and extends the shaft or piston rod 16. Such extension is assisted by a first compression spring 58 disposed in the first chamber 54 about the piston rod 16. A fluid port 57 communicates with the first chamber 54 and a valve 59. The valve 59 is illustrated as a ball/check valve, however, other kinds of valves may be employed without departing from the scope of the present invention. The valve 59 allows air or fluid to enter the first chamber 54 in order to prevent a vacuum from forming in the first chamber 54 when the piston 56 is returning to the Park position and when there is no pressurized fluid provided by a pressurized hydraulic fluid source, such as when the engine of the motor vehicle is off. Accordingly, the valve 59 increases the rate of return to the Park position.

The housing 32 of the servo or spool valve 30 also defines a first inlet port 62 which communicates between a source of pressurized hydraulic fluid (not illustrated) and the cylindrical bore 34 adjacent the third control port 48. A fourth control port 64 communicates through a second hydraulic line 66 with a second chamber 68 in the pressure assisted park servo 20. Pressurized hydraulic fluid in the second chamber 68 provides force against an opposite face 69 of the piston 56 and retracts the shaft or piston rod 16. A second exhaust port 72 adjacent the fourth control port 64 communicates between the bore 34 and the hydraulic sump or reservoir. A fifth control port 74 communicates with the bore 34 and receives pressurized hydraulic fluid from components within the transmission indicating that the transmission is in a forward gear. Finally, a sixth control port 76 is disposed at the second end of the bore 34 and communicates with the outlet or control side of the return to park solenoid 22.

Axially, slidably disposed within the cylindrical bore 34 of the housing 32 of the servo or spool valve 30 is a valve spool 80 having various diameters and shoulders which cooperate with the cylindrical bore 34 and the ports 40, 42, 46, 48, 62, 64, 72, 74 and 76 to control the direction and flow of hydraulic fluid to the pressure assisted park servo 20.

The valve spool 80, from left to right, includes a first shoulder 82 operatively associated with the first inlet port 40, a second shoulder 84 operatively associated with the second inlet port 42, a first control disc 86 operatively associated with the first exhaust port 46 and the third control port 48, a second control disc 88 operatively associated with the fourth control port 64 and the second exhaust port 72, a third shoulder 92 operatively associated with the fifth control port 74 and a fourth shoulder 94 operatively associated with the sixth control port 76.

As illustrated, a first stub potion 96 of the valve spool 80 extends beyond the first shoulder 82 and a second stub portion 98 of the valve spool 80 extends beyond the fourth shoulder 94 to limit translation of the valve spool 80 in left and right directions, respectively. In a portion of the bore 34 communicating with the port 76 and concentrically located about a portion of the valve spool 80 and contacting the fourth shoulder 94 is disposed a second compression spring 102.

Operation of the pressure assisted park servo 20 will now be described with serial reference to the drawings, beginning with FIG. 2. In FIG. 2, the automatic transmission 10 is in park and the spool 80 of the ETRS or spool valve 30 is at its left limit of travel (as viewed in the drawings). In this condition, pressurized hydraulic fluid, provided to the first inlet port 62, is present at the third control port 48 and pressurizes the first hydraulic line 52 and the first chamber 54 of the pressure assisted park servo 20, driving or maintaining the piston 56 and shaft or piston rod 16 of the pressure assisted park servo 20 to or in its park position, to the right as illustrated in FIG. 2.

Figure 3:
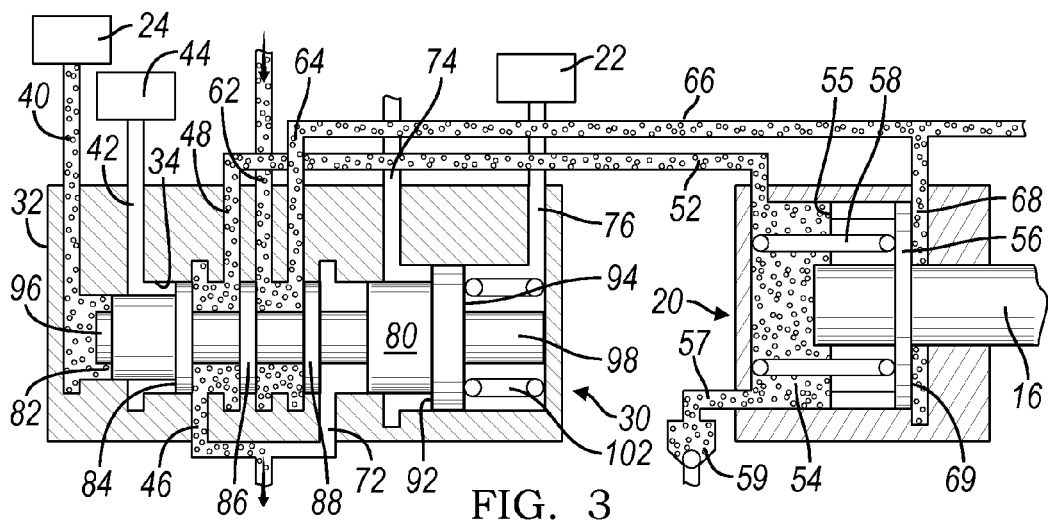
FIG. 3 is a diagrammatic view of a servo valve and pressure assisted park servo according to the present invention moving out of the park position.
Figure 4:
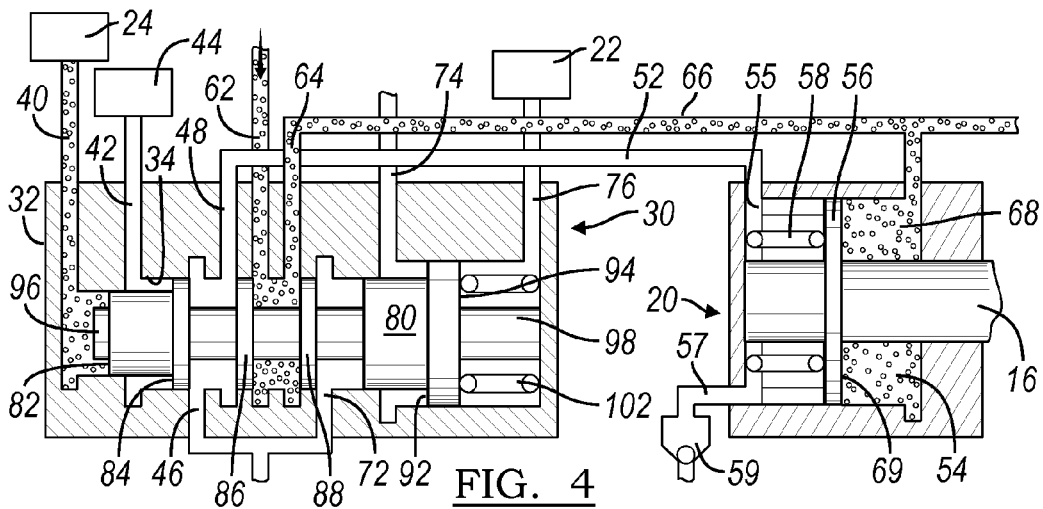
FIG. 4 is a diagrammatic view of a servo valve and pressure assisted park servo according to the present invention in the out of park position.

In FIGS. 3 and 4, the vehicle operator has requested a transmission operating range other than park and the out of park solenoid 24 is activated, providing hydraulic fluid to the first control port 40, applying pressure to the first shoulder 82 and causing translation of the valve spool 80 to the right. This action causes translation of the first control disc 86 which connects the first chamber 54 and the first hydraulic line 52 through the third control port 48 to the first exhaust port 46 which allows release of hydraulic fluid from the first chamber 54. Additionally, the second control disc 88 translates to the right and pressurized hydraulic fluid, present at the first inlet port 62, is provided to the fourth control port 64, the second hydraulic line 66 and the second chamber 68 to retract the shaft or piston rod 16 and move the manual shaft 12 and automatic transmission 10 out of park.

Figure 5:
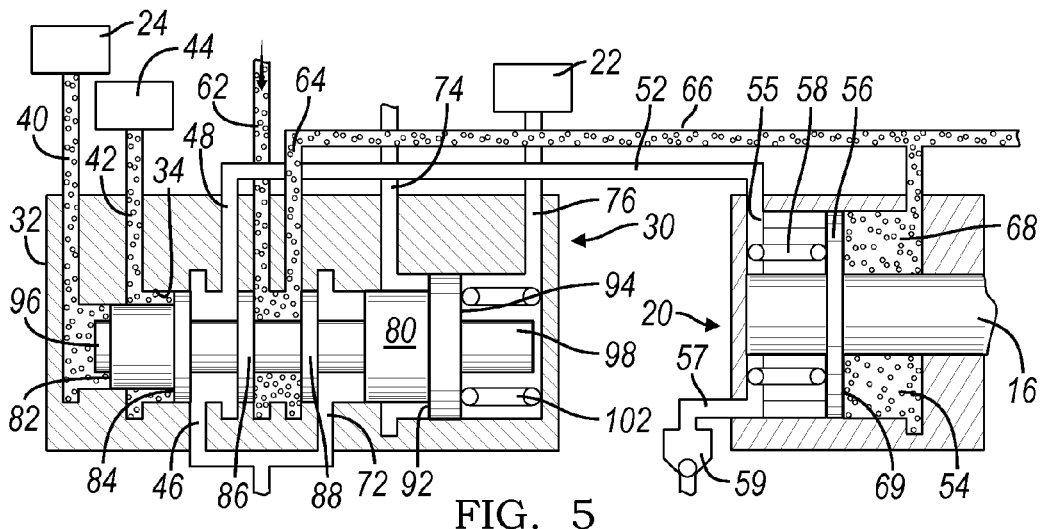
FIG. 5 is a diagrammatic view of a servo valve and pressure assisted park servo according to the present invention illustrating operation of a back up fluid circuit which maintains the pressure assisted park servo in the out of park position.

In FIG. 5, the drive and braking solenoid 44 is energized to supply pressurized hydraulic fluid to the second control port 42 and against the second shoulder 84. This provides an additional force to the valve spool 80 to maintain it in its rightmost (out of park) position and provides a back up or redundant feature to the out of park solenoid 24 to ensure that the transmission remains out of park.

Figure 6:
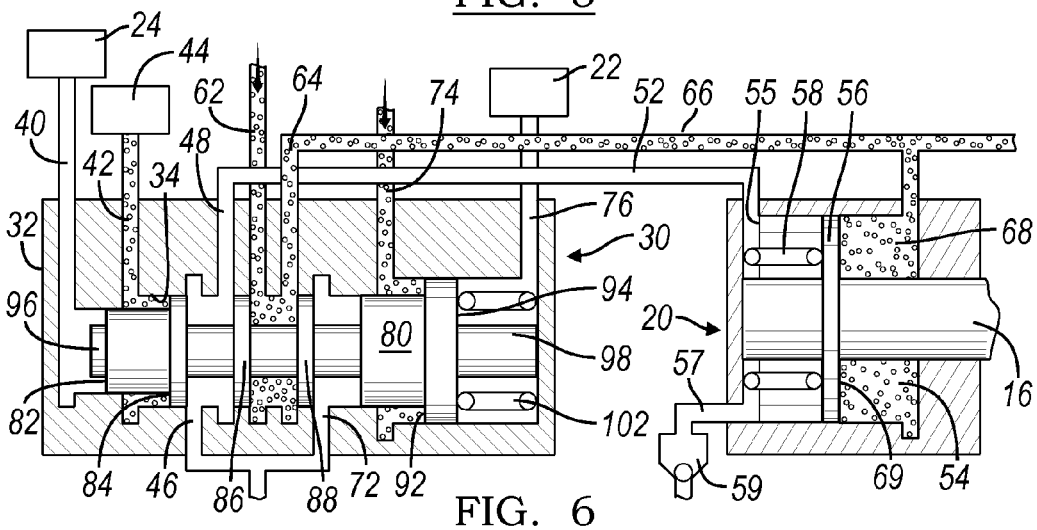
FIG. 6 is a diagrammatic view of a servo valve and pressure assisted park servo according to the present invention illustrating operation of a hydraulic latch which maintains the pressure assisted park servo in the out of park position.

In FIG. 6, the automatic transmission 10 is in a forward gear and pressurized hydraulic fluid from the transmission 10 is supplied to the fifth control port 74 and against the third shoulder 92 which also provides a force to the valve spool 80 to maintain it in its rightmost position. Given the redundancy, the out of park solenoid 24 may be turned off. While the drive and braking solenoid 44 may remain on, however, the transmission fluid provided to the fifth control port 74 provides a hydraulic latch which keeps the automatic transmission 10 out of park if the drive and braking solenoid 44 fails or the TEHCM controller stops working.

In FIG. 7, the vehicle operator requests park. Both the out of park solenoid 24 and the drive and braking solenoid 44 are de-energized and the return to park solenoid 22 is energized. Pressurized hydraulic fluid is then supplied to the sixth control port 76 and the fourth shoulder 94 of the valve spool 80 adjacent the second compression spring 102. The combination of hydraulic pressure and spring force moves the valve spool 80 back to the left, to the park position, faster than the compression spring 102 alone would be able to move the valve spool 80.

In FIG. 8, the valve spool 80 has translated to the left, to its park position, translating the second control disc 88 to the left and connecting the fourth control port 64, the second hydraulic line 66 and the second chamber 68 to the second exhaust port 72 to allow the hydraulic fluid in the second chamber 68 to be released. At the same time, the first control disc 86 translates to the left, the first inlet port 62 is placed in fluid communication with the third control port 48 and the first hydraulic line 52 and pressurized hydraulic fluid begins to fill the first chamber 54 of the pressure assisted park servo 20.

In FIG. 9, the piston 56 and the shaft or piston rod 16 of the pressure assisted park servo 20 have fully returned to the right, to the park position. By utilizing pressurized hydraulic fluid from the first inlet port 62, the motion of the piston 56 and the piston rod 16 of the pressure assisted park servo 20 is much faster than that achieved by utilizing the first compression spring 58 alone and the park position of the automatic transmission 10 is quickly achieved.

What is claimed is:
1. A device for initiating in a transmission a park mode of operation and an out of park mode of operation, the device comprising:
a housing that defines a cavity;

a piston slidably disposed within the cavity and moveable between a first position and a second position, the piston having a first face and a second face;

a first chamber defined by the housing and the first face of the piston;

a second chamber defined by the housing and the second face of the piston;

a first fluid port in communication with the first chamber;

a second fluid port in communication with the second chamber; and a biasing member disposed within the housing and in contact with the piston, a valve in direct communication with the first fluid port and the second fluid port and operable to selectively provide a pressurized fluid to the first fluid port and the second fluid port, and wherein when a pressurized fluid enters the first chamber from the first fluid port the piston is moved to the first position to shift the transmission into the park mode of operation and the valve provides fluid communication between the second fluid port and a vent port in order to vent a fluid from the second chamber when the park mode of operation is selected, and wherein when a pressurized fluid enters the second chamber from the second fluid port the piston is moved to the second position to shift the transmission into the out of park mode of operation and the valve provides fluid communication between the first fluid port and the vent port in order to vent a fluid from the first chamber when the out of park mode of operation is selected.

2. The device of claim 1 wherein the piston includes a piston rod that extends out from the housing.

3. The device of claim 2 wherein the second face is located on a side of the piston opposite the first face.

4. The device of claim 1 wherein the first chamber is hydraulically isolated from the second chamber by the piston.

5. The device of claim 1 wherein the valve assembly is hydraulically actuated by a plurality of solenoids in fluid communication with the valve assembly.

6. The device of claim 1 wherein the biasing member is a spring located within the first chamber.

7. The device of claim 1 further comprising a valve in communication with the first chamber, the valve operable to selectively allow at least one of a fluid and a gas to enter the first chamber when the piston moves to the first position.

8. A system for shifting a transmission into a first mode of operation and a second mode of operation, the system comprising:

a servo assembly comprising:

a housing that defines a cavity;

a piston slidably disposed within the cavity and moveable between a first position and a second position, the piston having a first face and a second face;

a first chamber defined by the housing and the first face of the piston;

a second chamber defined by the housing and the second face of the piston;

a first fluid port in communication with the first chamber;

a second fluid port in communication with the second chamber; and a biasing member located within the housing and in contact with the piston;

a valve assembly having a spool slidably disposed within a bore, the valve assembly having an inlet for receiving a pressurized fluid, a first outlet in communication with the first fluid port, a second outlet in communication with the second fluid port, and an exhaust port, wherein the valve assembly is operable to selectively provide the pressurized fluid from the inlet to the first outlet when the spool is in a first position and from the inlet to the second outlet when the spool is in a second position, and wherein the first outlet is in communication with the exhaust port when the spool is in the second position and the second outlet is in communication with the exhaust port when the spool is in the first position, wherein when the pressurized fluid is communicated to the first fluid port, the pressurized fluid enters the first chamber and the piston is moved to the first position to shift the transmission into the first mode of operation, and wherein when the pressurized fluid is communicated to the second fluid port, the pressurized fluid enters the second chamber and the piston is moved to the second position to shift the transmission into the second mode of operation.

9. The system of claim 8 wherein the spool of the valve assembly is moved to the first position by activation of a first solenoid in fluid communication with the valve assembly and wherein the spool of the valve assembly is moved to the second position by activation of a second solenoid in fluid communication with the valve assembly.

10. The system of claim 8 wherein the piston includes a piston rod that extends out from the housing.

11. The system of claim 10 wherein the second face is located on a side of the piston opposite the first face.

12. The system of claim 11 wherein the first chamber is hydraulically isolated from the second chamber by the piston.

13. The system of claim 12 wherein the biasing member is a spring located within the first chamber.

14. The system of claim 13 wherein the first mode of operation is a park mode of operation and wherein the second mode of operation is an out of park mode of operation.

* * * * *